June 20, 1939.  C. SAUZEDDE  2,162,751
WHEEL MOUNTING
Filed Aug. 3, 1935  2 Sheets-Sheet 1

INVENTOR.
Claude Sauzedde
BY
ATTORNEYS

June 20, 1939.   C. SAUZEDDE   2,162,751
WHEEL MOUNTING
Filed Aug. 3, 1935    2 Sheets-Sheet 2

INVENTOR.
Claude Sauzedde
BY
ATTORNEYS

Patented June 20, 1939

2,162,751

UNITED STATES PATENT OFFICE 2,162,751

WHEEL MOUNTING

Claude Sauzedde, Detroit, Mich., assignor to Detroit Hydrostatic Brake Corporation, Detroit, Mich., a corporation of Michigan Application August 3, 1935, Serial No. 34,584

3 Claims. (Cl. 301—6)

This invention relates to means for demountably attaching a tire supporting rim to a wheel hub. It is more particularly concerned with the type of hub shown in my co-pending application Serial No. 640,954 filed November 3, 1932 wherein the hub is composed of two sections having annular, angularly disposed braking surfaces and constituting a housing for enclosing a brake mechanism. The side walls of the sections forming such hubs are subjected to severe temperature conditions and it has been found difficult to provide them with lasting ornamental finishes due mostly to the fact that the heat generated in the walls adjacent to the braking surfaces tends to cause discoloration and deterioration of paint coatings thereon.

This invention has as its primary object to provide an ornamental wheel which will retain its ornamental appearance in service. This object is accomplished by attaching the tire supporting rim to the hub by means of a disk, the disk being so formed and attached to the hub in a manner whereby heat generated in the hub walls is dissipated into the surrounding air rather than being conducted into the disk. In other words, the disk is so formed that it provides for air circulation around all surfaces of the hub walls and it is attached to the hub walls at points located nearer to the axis of the hub than the annular braking surfaces. Externally of the braking surfaces the hub walls have heat dissipating fins which tend to dissipate heat into the surrounding air rather than have such heat conducted through the attachment means to the disk. The disk accordingly remains comparatively cool and may be provided with a lasting ornamental finish.

Another object of the invention is to provide means for centering a demountable disk type wheel with respect to a wheel supporting hub.

Another object of the invention is to provide a disk and brake enclosing hub assembly wherein the hub is nested within the disk which is of substantially conical form.

With the above and other ends in view the invention consists in matters hereinafter set forth with reference to the accompanying drawings, in which—

Like characters of reference are employed throughout to designate corresponding parts.

Figure 1:
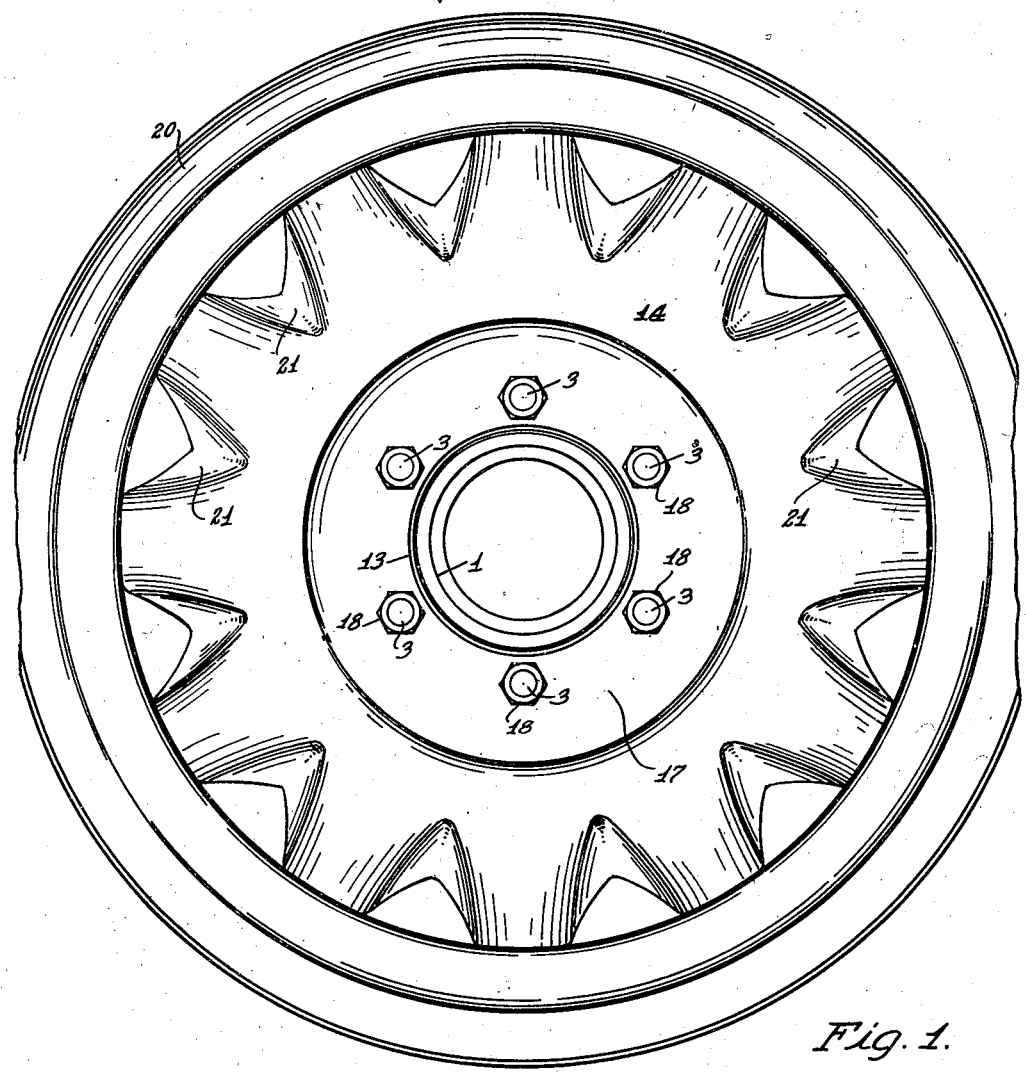
Figure 1 is a side elevation with the hub cap removed.
Figures 2, 3:
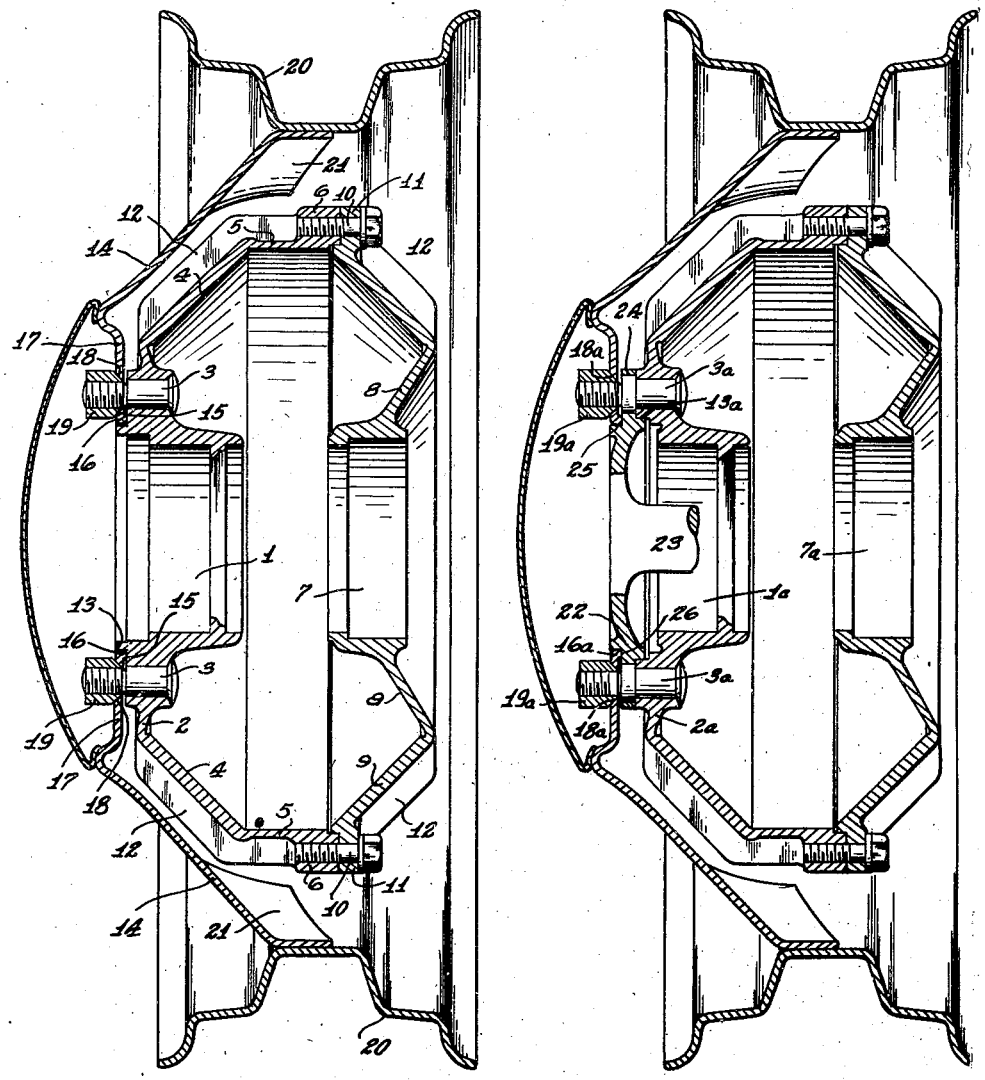
Fig. 2 is a transverse cross section.
Fig. 3 is a transverse cross section illustrating a modified assembly.

With reference more particularly to Fig. 2 there is illustrated an annular body 1 having an outwardly diverging annular part 2 with bolts 3 permanently assembled therein. Integral with the part 2 is an angularly disposed annular portion 4 providing an internal braking surface as will hereinafter more particularly appear. A cylindrical part 5 is formed integral with the outer periphery of the angular part 4 and is provided with a plurality of lugs 6. The annular part 1 extends inwardly with respect to the above described formation which constitutes a hub section.

A second hub section is provided which consists in an annular part 7 having an annular wall 8 with an angular annular wall 9 integral therewith. The angularity of the wall 9 is opposite to that of the angular wall 4 and it constitutes a second internal brake surface. The outer periphery of the annular wall contacts with the end of the cylindrical wall 5 and it is secured thereto by bolts 10 which pass through lugs 11 and enter the lugs 6 which are spaced to coincide therewith.

When the two hub sections are thus formed and thus secured together they comprise a hollow housing for a brake mechanism and the two annular parts 1 and 7 comprise bearing receiving means. Both annular parts 1 and 7 project inwardly of the hub so that the points of support of the hub are disposed inwardly of the planes of the side walls thereof.

Externally of the walls 4 and 9 are formed heat dissipating ribs 12 for the purpose of conveying heat from the walls which form the braking surfaces and for dissipating it into the surrounding air.

The annular part 1 is provided with a co-axial annular shoulder 13 for centering a disk 14 with respect to the hub, the disk 14 having a central opening adapted to fit over the shoulder 13. The outer surface of the hub part 2 has a straight wall portion 15 against which an annular bead 16, surrounding the central opening in the disk 14, seats. The disk 14 has a central wall portion 17 extending radially, with respect to the bead 16, and having apertures 18 through which the bolts 3 extend. Nuts 19 are placed on the bolts 3 to attach the disk to the hub, it being noted that when the nuts are drawn tight, as shown in Fig. 2, the straight wall part 17 of the disk 17 remains spaced from the wall 2 and its straight wall part 15. The bead 16 maintains this space.

The disk 14 is of substantially conical form, with the exception of the straight wall part 17, and a rim 20 is secured to the outer periphery thereof. The wall of the disk 14 has portions 21 pressed inwardly with respect to the normal plane of the wall to give the wheel the appearance of spokes.

It will be noted in Fig. 2 that the hub formed as described above is nested within the disk 14 and that the only part of the disk contacting with the walls of the hub is the bead 16. This construction results in a comparatively small area of contact between the disk and hub and lessens the heat conducting capacity to such an extent that only a small amount of heat is transferred through these contacting surfaces to the disk. The remainder of the disk is insulated by providing an air space between the same and the hub, the air space increasing in size at points adjacent to the braking zone in the hub.

In the embodiment shown in Fig. 3 the construction as far as the wheel and hub is concerned is identical to that referred to above. However, in this form the disk is connected to a live axle spindle to which power may be applied for the purpose of rotating the wheel.

With reference more particularly to Fig. 3 there is shown a hub formed of two sections having annular parts 1a and 7a for the reception of bearings. The hub part 2a has an annular shoulder 13a for centering a head 22 on a live axle shaft 23. Bolts 3a secured in the hub part 2a extend through apertures 24 in the head 22 and the head 22 is provided with an annular shoulder 25. A disk 14a is formed with a straight walled portion 17a having a central opening with a bead 16a surrounding the same. The disk is assembled on the head 22 with the bead 16a contacting with a flat surface 26 formed thereon and the bolts 3a extend through apertures 18a in the disk. Nuts 19a are placed on the bolts 3a and when drawn tight as shown in Fig. 3 they secure the disk 14a and the head 22 to the hub wall 2a.

In this latter form it will be noted that only a small area of contact is present between the head 22 and the disk 14a with the result that only a small amount of heat is transferred from the hub through the head 22 to the disk 14a. It will also be noted that in this form also air spaces are provided between the walls defining the braking zone of the hub and the disk 14.

In both forms described it will be noted that the annular bead surrounding the central opening in the disk bears against a flat surface. In one case the flat surface is designated as 15 and in the other case by the numeral 26. The outer face of the bead, that is, the face which contacts with the flat surface, is machined perfectly true with respect to a plane perpendicular to the axis of the disk. This construction requires a very small amount of machining and permits the disk 14 to be formed of a steel blank which is pressed into the described form.

Although specific embodiments of the invention are illustrated and described it will be understood that various changes may be made within the scope of the appended claims without departing from the spirit of the invention, and such changes are contemplated.

What I claim is:—

1. In vehicle wheel assemblies wherein a wheel formation is demountably secured bodily to a hub structure forming a housing for a brake mechanism, a hub comprising outer and inner disks having axial formations designed to support the same, the two disks being secured together at their peripheries whereby the inner disk stabilizes the outer disk, said outer disk comprising an oblique portion comprising a braking surface and a radial portion integrally uniting the oblique portion with the axial formation, securing elements for a wheel formation on said radial portion, a positioning element for said wheel formation formed at said axial formation, a wheel formation positioned by said element and secured on said radial portion, said wheel formation having a disk shaped to simulate the outer appearance of the outer disk formation, said disk being spaced from the outer section to permit the circulation of air therebetween and in parallel spaced relation to said radial portion thereat.

2. In vehicle wheel assemblies wherein a wheel formation is demountably secured bodily to a hub structure forming a housing for a brake mechanism, a hub comprising outer and inner disks having axial formations designed to support the same, the two disks being secured together at their peripheries whereby the inner disk stabilizes the outer disk, said outer disk comprising an oblique portion comprising a braking surface and a radial portion integrally uniting the oblique portion with the axial formation, securing elements for a wheel formation on said radial portion, a positioning element for said wheel formation formed at said axial formation, a wheel formation positioned by said element and secured on said radial portion, said wheel formation having a disk shaped to simulate the outer appearance of the outer disk formation, said disk bearing an ornamental coating which is subject to damage by heat, and said disk being spaced from said outer section whereby air may circulate therebetween to prevent the transfer of heat from the oblique portion of said outer disk to the wheel disk and in parallel spaced relation to said radial portion to further prevent the transfer of heat thereat.

3. In vehicle wheel assemblies wherein a wheel formation is demountably secured bodily to a hub structure forming a housing for a brake mechanism, a hub having an outer disk with an oblique portion constituting a braking surface, said disk having an axial formation designed to support the same and a radial portion integrally uniting the oblique portion with the axial formation, a shoulder formed at said axial portion, a wheel formation secured on said radial portion and axially positioned by said shoulder, said wheel formation having a disk shaped to simulate the outer appearance of said disk, said wheel formation disk bearing an ornamental coating which is subject to damage by heat, and said wheel formation disk being spaced from said oblique portion and in parallel spaced relation to said radial portion so that the contact between said outer hub disk and said wheel disk at said axial formation is remote from said radial and oblique portions whereby circulation of air between said disks prevents the transfer of heat from said oblique and radial portions to the wheel formation disk.

CLAUDE SAUZEDDE.